Dec. 15, 1964 R. F. STROBEL 3,161,530
COATED PIPE AND PROCESS
Filed Aug. 10, 1959
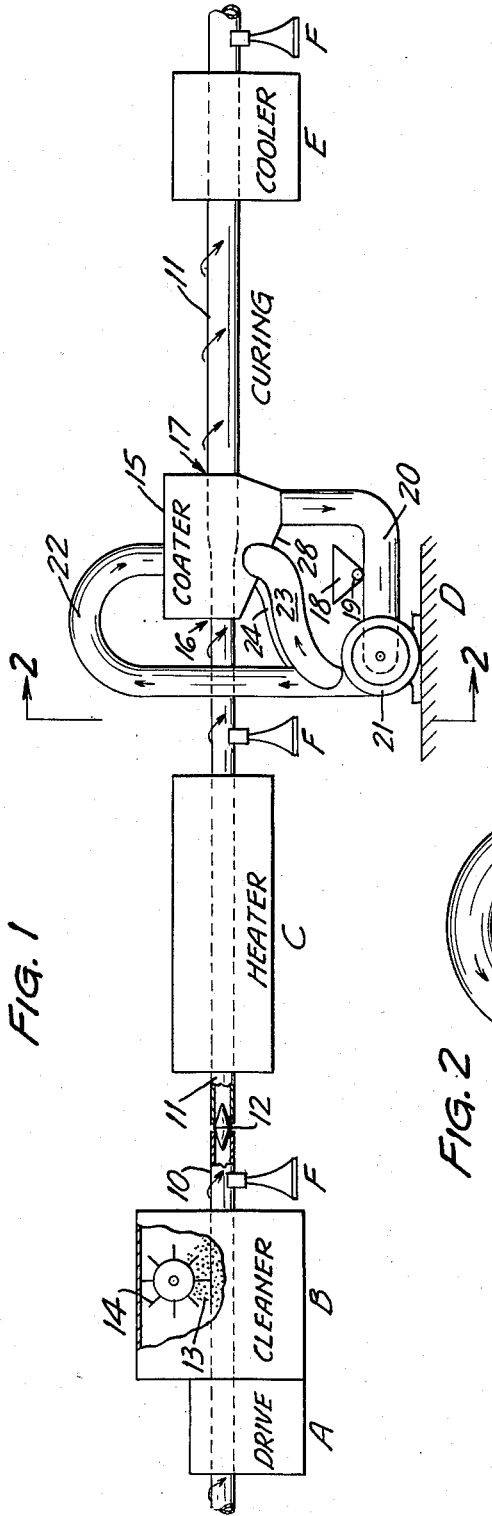
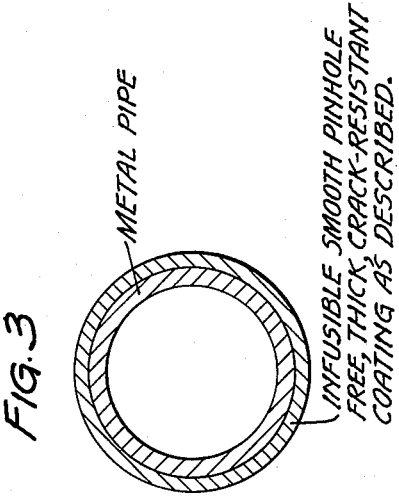
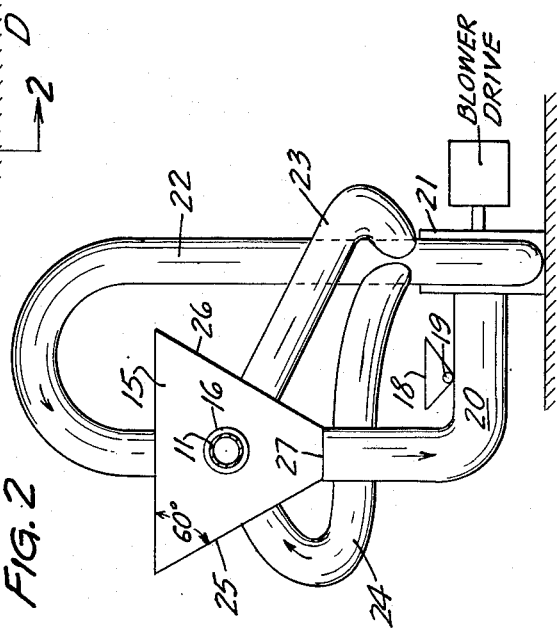
INVENTOR
RUPERT F. STROBEL
BY
Carpenter, Abbott, Coulter & Kinney
ATTORNEYS

United States Patent Office 3,161,530
Patented Dec. 15, 1964

3,161,530
COATED PIPE AND PROCESS
Rupert F. Strobel, St. Paul, Minn., assignor to Minnesota Mining and Manufacturing Company, St. Paul, Minn., a corporation of Delaware
Filed Aug. 10, 1959, Ser. No. 832,553
6 Claims. (Cl. 117—18)

This invention relates to protectively coated pipe articles and the like, and particularly relates to metal pipe having a thick adherent crack-resistant infusible resin coating formed by passing pre-heated pipe through a mist of pulverulent resin material. The invention further relates to a convenient, fast, and continuous method for forming infusible protective coatings on pipe.

The protection of metal pipe against corrosion is recognized to be of vital importance where, for example, the pipe is to be laid underground and thus exposed to the corroding effects of chemicals in soil. Pipe-wrap tapes have been used for this purpose, but the wrapping has seams and careless application of the tape may leave areas of the metal pipe exposed to corrosive elements. Pipes extrusion-coated with thermoplastics such as polyethylene are protected to an extent, but the adhesion of polyethylene to metal pipe is of a low order; and in addition, rocks in soil tend to push the thermoplastic coating out of place either at the time of burying the pipe or after a period of time pressing against the buried pipe. Once ruptured or displaced as a result of cold-flow, the thermoplastic coating no longer serves as a barrier; and moisture and electrolytes in the soil may eat their way underneath a poorly adhered coating from a point of rupture. Thermosetting resinous materials to provide protective coatings for metal pipe have been applied from liquid masses thereof, followed by a baking step to cure the resin coating. The steps of applying liquid resin, followed by baking, have been repeated as many as six or more times in order to build up coatings of a thickness of only a few mils, e.g., 6 mils. Aside from the time-consuming procedure involved, pipe coaters need extensive heating ovens or chambers to conduct this process, which makes the process expensive. Also defects in the process tend to create other problems, e.g., blistering of the coating caused by the repeated curing cycles, as well as the formation of pinholes or other defects in the end article. The method of applying the coating also tends to cause the resin to draw itself off of irregular projections on the external surface of the usual commercial pipe, leaving them covered with so little material that diffusion therethrough constitutes a problem. The coating formed by the process includes a series of laminated layers which, in toto, have approached only a minimum thickness simply because greater thicknesses would increase the cost of the production untowardly. Insofar as is known, coatings prepared according to this process are rather easily separated from the underlying pipe, or chipped or flaked by ordinary handling of the coated pipe incident to shipment or stockpiling at a place of installation.

The present invention provides a coated pipe article which overcomes defects and disadvantages such as aforenoted in the prior art coated pipe articles. The pipe of this invention has a smooth coating of essentially uniform thickness and of sufficient thickness (e.g., about 8 mils or more) to provide adequate protection. The coating is firmly bonded to the underlying metal pipe surface, and is tough and impact resistant. It is not chipped or cracked by ordinary handling incident to shipment and stockpiling at a place of use. Lengths of my coated pipe may be tossed in a pile, in a manner customary in handling pipe, without rupture or cracking or flaking of the coating. The coating is insoluble in all common solvents. It is infusible and consists of a seamless tough sheath integrally united with the underlying metal pipe. It is not displaced by cold-flow as in the case of thermoplastic coatings. The process of forming the coating avoids the development of pinholes and blisters. Even though the coating has the foregoing properties, and particularly the property of being infusible and being of a substantial and uniform thickness to provide adequate protection, it surprisingly can be formed in minutes using only a single material-applying step. In brief, the process of coating pipe according to this invention comprises continuously passing a pre-cleaned and pre-heated pipe through a mist of pulverulent temporarily-thermosoftenable, rapidly-thermosetting organic resin material, out of which mist the particles of pulverulent material contacting the heated pipe adhere to its surface and coalesce to form a uniformly thick coating which autogenously thermosets in situ to an infusible state within minutes, or even seconds, after being applied.

The details of the invention will now be further explained and described with particular reference to a drawing made a part hereof, wherein:

FIGURE 1 is a diagrammatic side view of apparatus and serves in the nature of a flow sheet to illustrate the process hereof;

FIGURE 2 is a view of the coater in FIGURE 1, taken from the left along line 2—2 of FIGURE 1; and FIGURE 3 is a cross-sectional view showing an end of pipe provided with a protective coating as described herein.

Referring to FIGURE 1, two lengths of metal pipe 10 and 11, joined together by a double-coned coupler 12, are shown moving from left to right, in a clockwise rotation when viewed from the left of the figure, by a drive unit A of conventional manufacture. The external surfaces of the pipe are subjected to a cleaning action in cleaner B, also of conventional manufacture. The pipe is then passed through a heater C where the temperature of the pipe is raised above the lowest temperature at which the pulverulent material used in coating becomes infusible, and up to a temperature at which the pulverulent material decomposes on contact with the heated pipe in the coater D. It is preferable to pass the pipe directly from heater C into coater D, as this arrangement permits of maximum control of the temperature of the pipe as it passes through the coater D. In coater D, the pipe is passed through a mist of a pulverulent temporarily-thermosoftenable, rapidly-thermosetting organic resin material. Particles of the mist contacting the heated pipe adhere to its surface, and coalesce using heat from the pre-heated pipe to form an essentially uniformly thick coating which autogenously thermosets in situ. Passing out of coater D, the heat of the pipe continues to effect curing of the coalesced thermosetting material on its surface; but within minutes or even seconds after passing from the coater, the coalesced thermosetting material is essentially completely cured on the pipe surface. Cooling of the coated pipe then is accomplished by passing the pipe through a cooler E so as to permit handling of the finished coated pipe by an operator.

Illustrated schematically in FIGURE 1 are several supports F for the pipe, and these may simply be U-shaped channels having multi-rotational castors within the U on which the pipe rides.

It will be noted that the coated pipe is not transferred from the coater in FIGURE 1 into a drying oven or curing oven. Such a time-consuming and expensive step is entirely avoided by the process. With elimination of post-baking, problems of transferring long lengths of pipe from a coating operation to a curing oven are avoided, and no smudging or displacement of an uncured coating occurs. As illustrated in the drawing, coated pipe leaving coater D is cantilevered out so that curing takes place while it is suspended free of contacting supports and the like. There is no need to employ brushes or other smoothing means to impart a smooth finish to the coating of the pipe. The coating equipment can be shut off without clogging or jamming up. The coated pipe is a finished article of manufacture after passing through the apparatus illustrated in FIGURE 1.

The process, and how it is accomplished, will now be described in further retail. As aforenoted, lengths of pipe are coupled together, suitably by a double-coned coupler 12, to permit continuous coating operation. A conventional drive A may be used to grip the pipe and pass it horizontally through the elements of apparatus illustrated in FIGURE 1. Rotation of the pipe in a clockwise or counter-clockwise direction is readily accomplished by such conventional units, and is useful in conducting the instant process. Rotation is not essential when a coater unit of the design illustrated in FIGURES 1 and 2 is employed, but it does facilitate cleaning in cleaner B. As illustrated in the broken section of cleaner B, abrasive grit 13 is whipped against the surface of the pipe as it passes through the cleaner by a rotary flap-wheel 14 located above the pipe. It is essential that the surface of the pipe be free of loose rust, dust, grease, oils, and the like in order for a strong bond between the infusible resin coating and the underlying pipe to be formed. Any suitable cleaning means or method may be employed to accomplish this end, including sand blasting, acid etching, etc.

Heating of the pipe to a satisfactory temperature for coating may be accomplished using open flame gas jets, infra-red heaters, etc. Where heating is conducted after cleaning the pipe, as illustrated, it is important that no deposit of material is made upon the surface of the pipe; thus, where on open flame is used, caution should be taken to effect complete combustion and not leave any carbon deposit on the pipe surface.

The coater, referred to broadly as item D in FIGURE 1, includes a mist or dust chamber 15 through which pipe 11 is passed. The entry port 16, as well as the exit port 17 of the coating chamber 15, are of only slightly larger diameter than the diameter of the uncoated pipe and the coated pipe, respectively. Unduly large entry and exit ports allow escape and waste of the pulverulent coating material. Small ports and the maintenance of a slightly reduced pressure within the coating chamber 15 serve in combination to prevent escape of the dust or mist of the pulverulent coating material from the coater. In practice, the adaptation of a single coater to accommodate pipes of various outer diameter may require that the entry and exit ports for the pipe be made adjustable, which is easily accomplished by using screw-out inserts to regulate port diameters. Also, if desired, concentric flaps of a low-adhesion flexible material such as "Teflon" may be attached to the ports and used as a flexible annulus through which the pipe freely passes in entering and leaving the coater so as to minimize escape of coating material through the ports.

Raw pulverulent organic resin material is fed into a hopper 18, which in turn feeds it by screw 19 gradually into conduit 20 emptying into blower chamber 21. The rate of feed is adjusted to replenish material used up in coating, and this will vary depending upon the rate of coating, pre-heat temperature of the pipe, etc., as will further be discussed below. In blower chamber 21, the dust or pulverulent material is forced out through conduits 22, 23 and 24, in the direction illustrated by the arrows in FIGURE 1, and then into coating chamber 15. The dust carried through conduit 22 is emptied directly on top of the heated pipe passing through chamber 15, whereas dust through conduits 23 and 24 is directed into coating chamber 15 toward pipe 11 at approximately 120° angles from the dust blown through conduit 22. The dust is rather fine, being capable of passing through a screen of about 40 mesh, and the turbulence within coating chamber 15 causes the entire chamber to be filled with a mist of the pulverulent organic resin coating material. In the coater illustrated, the high turbulence within chamber 15 prevents dust from settling upon bottom surfaces of the chamber; however, it is preferable to arrange the sidewalls 25 and 26 of the coater 15 at approximately a 60° slant from the horizontal, and to extend them to an exit duct 27 of the coating chamber so as to obviate settling of dust within the chamber. Baffles to disrupt air currents and increase turbulence in the chamber may also be used. That dust settling has not been a problem within the high turbulence chamber here illustrated is emphasized by the fact that a small section of the bottom 28 of coating chamber 15 is at an angle much less than 60° from the horizontal. From the coating chamber, the dust is withdrawn through port 27 into conduit 20 by the suction of the fan within centrifugal blower chamber 21. Where it is desired to maintain coating chamber 15 at a slightly reduced pressure as compared to the outer atmosphere, chamber 15 of the coating chamber may be ducted to a suction filtering device, or conduit 20 may, immediately before the point of feeding raw pulverized material thereinto, be connected with a suction filter. Resin particles collected on a filter are later returned to the coater by placing the particles in hopper 18.

Pipe passing through coating chamber 15 is at a raised temperature, at least above the lowest temperature at which the pulverulent material in the mist of the coater becomes infusible. This temperature should be at least about 300° F. in preferred embodiments of the process herein illustrated; but lower temperatures, even as low as 200° F. or 150° F. may be suitable where the particular pulverulent coating material employed becomes infusible rapidly at such lower temperature. The critical point is that the lowest operating temperature for the heated pipe must be at least above the lowest temperature at which the pulverulent material adheres or fuses to the heated pipe, coalesces into a smooth film, and rapidly thermosets to an infusible state, without need for subsequent baking. At the other extreme, the highest coating temperature for the pipe must be no greater than that temperature at which the pulverulent material decomposes on contact with it. Thus, temperatures as high as 450° F., or even higher, e.g., 600° F., may be employed where the pulverized organic resin material exhibits a high resistance to decomposition at elevated temperatures (and where the pipe selected for coating does not melt at such elevated temperature). It is generally preferable to pass the pipe through the coater at a pre-heated temperature near the maximum tolerable by the pulverulent coating material without decomposition, since such elevated temperatures permit the complete process to be accomplished at almost unbelievable rates of speed (e.g., pipe coated at 60 or even 100 feet or more per minute is possible with results as described).

Surprisingly, it is found that coating pipe according to the process hereof permits of extremely accurate control of the thickness of coating material applied. Smooth uniformly-thick coatings varying less than ¼ of a mil in thickness over 20 to 30 foot lengths of pipe have been formed using my process. In passing through the coater, particles of the pulverulent material contacting the hot pipe adhere to it and fuse and coalesce within seconds. Gradually a thickness of the resin material is built up on the hot pipe. After a certain thickness is reached, depending primarily upon the pre-heat temperature of the pipe itself and the rate of movement through the coater, additional particles contacting the outer surface of the built-up coatings in the coater do not adhere or coalesce upon that surface. The resin material itself, after it reaches a substantial thickness, serves as a temporary heat insulator, and the rate of movement of the pipe through the coater may be adjusted so that the pipe exits from the coater before the outer portion of a built-up coating reaches an equilibrium temperature with the underlying pipe. By so doing, the outermost portion of the built-up coating on the pipe leaves the chamber before it reaches a temperature sufficient to cause pulverulent resin sticking to it in the coater to fuse and coalesce thereupon. Immediately upon exit from the coater, any particles of resin material adhering to the outer surface of the pipe are raised in temperature by the action of heat conduction from the pipe through the underlying resin coating to an extent sufficient to cause them to fuse and coalesce with other material on the coated surface, and leave a smooth uniform pinhole-free coating on the pipe. For a few feet (e.g., about 5 feet for rates of coating around 20 feet per minute and about 10 to 15 feet for rates of coating around 60 to 100 feet per minute) after the pipe leaves the coater, it is cantilevered out and allowed to remain at an elevated temperature. During this time, as well as while in the coater, curing of the coating takes place. This curing action occurs autogenously by virtue of the components employed in the pulverized mass used in coating, in combination with the heat-activation caused by heat from the pipe upon which the material is applied.

Particularly preferred pulverulent temporarily-thermosoftenable and rapidly-thermosetting particles for use in this process are mixtures of epoxy resins, latent heat-activatable epoxy-reactive hardeners, and accelerators or catalysts for the reaction between the epoxy resin and the hardeners therefor. The mixture must be a solid at room temperature, which generally means that the ingredients themselves in the mixture must be solid at room temperature, although a small part of the total blended mixture may consist of ingredients which are ordinarily liquid at room temperature, but do not upset the solid nature of the blend. Fillers, pigments, and other materials may be incorporated in the composition to regulate flow, impart color, or gain other modified properties as imparted to the composition by such additions. Illustrative pulverulent epoxy resin masses of the general type for use in the process are set forth in a copending application of Winthrop and Skotnicki, Serial No. 712,119, filed January 30, 1958, now abandoned, and the disclosure of that application is here incorporated by reference. A useful formulation of pulverulent temporarily-thermosoftenable rapidly-thermosetting epoxy resin composition of the general type disclosed in the aforenoted Winthrop et al. application may be formed as follows: 295.7 parts of "Epon 1001" and 295.7 parts of "Epon 1002" are softened and banded on a warm two-roll rubber mill at a minimum elevated temperature, e.g., about 180° F. Then 2.3 parts of tris(dimethylaminomethyl) phenol, a catalyst for reaction between epoxy resin and epoxy reactive hardeners therefor, are blended in the mass of resin on the mill. Next, about 5.3 parts of alkyl ammonium bentonite ("Bentone–38," a filler-catalyst material), about 350 parts of finely divided mica filler, and about 10 parts of chrome oxide pigment are added and mixing continued on the two-roll rubber mill until a blend is obtained. About 51 parts of isophthalyl dihydrazide (melts at about 420° F.), a hardener for epoxy resins, is then added slowly to the mill and blended with the other ingredients. Then 10 parts of dicyandiamide, which serves as a hardener for epoxy resins and also as a catalyst for a reaction between other hardeners and epoxy resins, are added and blended in the mass on the mill. The total time on the rubber mill for forming this mixture need not exceed about 23 minutes. It is preferable to accomplish the foregoing as rapidly as possible so as to minimize reaction between the components. After about 23 minutes on the mill, Dry Ice is added to lower the temperature of the composition; and it is then sheeted off, further cooled and ground to a fine particle size using, for example, a corn mill. Generally, the particles should pass through a 40 mesh screen and may be as small as 200 mesh, or even smaller (e.g., minus 325 mesh). However, particles of about 80 mesh or smaller are preferred. The particles of this composition melt or fuse at about 300° F., and within a minute or so after fusing at this temperature, the mass gels and cures to a thermoset infusible state. At 450 °F., the particles of this composition melt, fuse and cure to a thermoset infusible state within seconds.

It will be readily understood, particularly by reference to the disclosure in the afore-identified copending Winthrop et al. application, that a variety of epoxy resins may be used as the base for an epoxy resin pulverulent powder suitable for conducting the process of this invention. Epoxy resins are well known and generally consist of the reaction product of Bisphenol A and epichlorhydrin, the reaction being carried out under alkaline conditions. "Epon 1001" is one such resin. It has an epoxy equivalency of 425–550, and a Durrans' mercury method melting point of about 70° C. (about 155° F.). "Epon 1002" is an analogous epoxy resin having an epoxy equivalency of 550–700, and a Durrans' mercury method melting range of 75–85° C. (165–185° F.). Epoxy resins generally may be characterized as having more than one 1,2-epoxy group

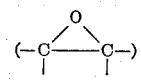

per average molecular weight of resin. Reactions between epichlorhydrin or equivalent 1,2-epoxy compound with polyhydric phenols or other polyhydric compounds (e.g., novolac, 1,3,5-trihydroxy benzene) are widely known as suitable epoxy resin compounds. Also, epoxy resins may be produced by epoxidizing double bonds of unsaturated hydrocarbons, as is well known. Characteristically, epoxy resins contain the oxirane oxygen grouping afore-identified as the 1,2-epoxy group.

In addition to dihydrazide hardeners, such as illustrated in Wear Patent No. 2,847,395, here incorporated by reference, many other hardeners have been used as reactants with epoxy resins to give an insoluble and infusible thermoset mass. Chlorendic anhydride (melts at about 460° F.) is but illustrative of many anhydrides useful as latent heat-activated epoxy-reactive hardeners. Preferably the mixture of epoxy resin and hardener will include approximately equal reaction equivalents of epoxy resin and hardener, as illustrated in the afore-identified Wear patent, and is also illustrated in a patent to Rudoff No. 2,744,845, dealing with chlorendic anhydride as a preferred type of anhydride hardener for epoxy resins. Catalysts or accelerators are used to further increase the rate of reaction between the hardener and epoxy resin. Generally, tertiary amines and their acid salts have proved to be especially effective to increase the rate of cure of the preferred compositions at elevated temperatures, and yet not unduly affect the stability of the composition when retained at room temperature or below. In addition to the catalyst mentioned in the specific resin composition identified above, others which are illustrative are alpha methyl-benzyldimethylamine, acid salts of tris (dimethylaminomethyl) phenol, diethylaminopropylphthalimide, as well as the salicylic acid salt thereof, etc.

The rapidly thermosetting character of the pulverulent resin mass employed in the coating procedure of this invention may, at first blush, indicate to the uninitiated that the pulverulent resin powder would not be stable under room temperature conditions in handling. Such, however, is a particularly surprising feature of the invention disclosed in the copending Winthrop and Skotnicki application. The blended powder particles of that invention, a further example of which is set forth above as a preferred powder composition to employ in the practice of the instant invention, surprisingly remain stable under room temperature storage conditions, and even have been noted to remain stable and free of clumping at slightly elevated temperature for up to three weeks or even longer.

As a specific illustration of the process of the instant invention using the foregoing powder, a clean steel pipe was heated to about 440° F. using an open gas flame heater with the pipe passing through the heater exposed to a blue flame, while being moved at a rate of about 16 feet per minute and rotated at about 60 r.p.m. through coater D. In coater D the pipe was exposed to a mist of resin particles formed as described above with each particle comprising a blend of epoxy resin, hardener for the epoxy, and accelerator for the reaction between hardener and epoxy. The coating chamber 15 in this illustration was only about 1 foot long and about 1½ cubic feet in volume; therefore, the lower rate of speed for movement of the pipe through the coater was used. Longer coating chambers permit of more rapid movement, as aforediscussed. No cooling of the resin particles circulated through the coating chamber is necessary, and none was employed. The mist of resin powder in the coater was maintained at a dense, dust-storm concentration. (About one pound of resin particles were maintained in the coating chamber itself, but this figure is only illustrative and may vary considerably without upsetting uniformity of coating. The pickup of resin particles by the pipe is largely governed by the pre-heat temperature of the pipe, assuming an adequate pre-heat temperature is used, and assuming at least a sufficient concentration of resin is maintained in the coating chamber so that, as the pipe exits the chamber at the rate of coating employed, an exterior dull layer of particles partially fused is noted to be upon it.) Epoxy resin particles contacting the heated pipe in the coating chamber melted, softened and gelled upon the surface of the pipe within seconds. (At the time of melting on the surface of the pipe, the functional portions of the molecules of epoxy and hardening agent apparently tend to align for reaction, and the catalyst or accelerator in the composition increases the rate of reaction.) Pits or irregularities on the surface of the pipe were filled with the fused epoxy resin material, and capillary forces tended to draw the fused resin into a compact mass on the pipe, excluding air from the coating. The heat of the metal pipe, as aforenoted, was sufficient to effect heating of the coated mass of resin on the pipe and cause essentially complete curing of the same to an infusible state within an astonishingly short period. Approximately 5 feet of pipe exiting from the coater was left free of contact and allowed to remain at the equilibrium temperature reached between the coating on the pipe and the underlying heated pipe. Then the coated pipe was sprayed with cool water to effect cooling.

This procedure resulted in providing the pipe with a coating approximately 10 mils in thickness. Slower movement of the pipe through the coating chamber, as well as a slightly increased pre-heat temperature for the pipe, can be used to provide a coating as high as approximately 40 mils in thickness. For adequate protection it is quite important to achieve substantial coating thicknesses as described. Coatings less than 5 or 6 mils in thickness are generally unsatisfactory, simply because the non-concentricity of the usual commercial pipe, as well as scratches and irregular spots on the surface of pipe, require some substantial build-up of coating in order to provide a smooth outer surface which will effect maximum protection against corrosion and the like. Thinner coatings may cover minor metal projections from the pipe with so little material as to allow a point for easy diffusion through the coating, and therefore permit breakdown of the barrier against corrosion. However, it should be recognized that the process of preparing the coating described herein tends to effect maximum coverage of even irregular projections from a pipe surface, a result quite distinct from that obtained by applying liquid masses of resin upon a pipe surface, which later tend to draw off of projections. Specifically, irregular projections (or regular projections such as trade-marks) on the pipe are coated by this process with a thickness of coating about equal to that of the thickness of coating along smooth sections of pipe. Coatings of substantial thickness as herein described desirably provide maximum resistance to diffusion therethrough, serving as an effective barrier against the transfer of solvents and ions by migration through the coating.

A one-inch outer diameter steel pipe coated according to the foregoing illustrative process with a 10-mil coating was immersed in salt water for nine months. It was connected through a 3-volt battery to a graphite cathode immersed in the same electrolyte. The initial resistivity of this circuit was $10^{14}$ ohm-ft. The resistivity after 9 months was $10^{12}$ ohm-ft. A standard polyvinyl chloride 10 mil pipe-wrap tape wrapped in overlapping convolutions (e.g., 20 mil thick layer) on a one inch steel pipe was immersed in the same way and under the same conditions was noted to drop from an initial reading of $10^{13}$ ohm-ft. to $10^{8}$ ohm-ft. after nine months. An 8 pound ball dropped from a distance of 6 feet has not cracked the coating of pipe put on according to this invention. The coating will resist substantial hammer blows without shattering or peeling off. Tests have indicated that shear forces of several thousand p.s.i. would be required to separate my coating from underlying pipe. Immersion of coated pipe of this invention in hydrochloric acid, sodium hydroxide, boiling heptane, hot oil, etc., for periods up to 24 hours has left the coating and bond of the coating to the underlying pipe essentially unaffected. Hot fluids can be passed through the pipe leaving its coating essentially unaffected.

The instant process is useful in coating a variety of metal pipes, e.g., steel, nickel-clad steel, nickel, copper, brass, iron, etc. Angle irons, channel irons, etc., may also be protectively coated using the teachings herein.

It will be appreciated that the embodiments of the invention aforeillustrated may be varied in several respects without departing from the essential spirit of my teaching. For example, the physical shape and form of the coater chamber may be varied. The coater may take the form of a tumbling barrel, with baffles to aid in maintaining a dust storm or mist of the pulverulent resin coating material. Where superior results are not so critical, pulverulent resin materials may be used which consist of mixtures of separate particles of resin, hardener, accelerator, etc.

The foregoing is to be construed as illustrative and not limitative of my invention and the further disclosure thereof as set forth in the claims appended hereto.

That which is claimed is:

1. A continuous process of coating metal pipe with an infusible resin coating to protect the pipe against corrosion, the process being one wherein the pipe is coated by passing it horizontally through an enveloping mist of a pulverulent temporarily-thermosoftenable organic resin material which rapidly thermosets to an infusible state, and comprising continuously moving a pre-cleaned and pre-heated pipe horizontally through said mist of pulverulent material at a rate of movement sufficient to allow particles of said pulverulent material to strike and adhere upon the entire circumference of the outer surface of said pipe and coalesce thereupon to form an essentially uniformly thick pinhole-free coating which autogenously thermosets in situ to an infusible state using residual heat from said underlying pipe, said pipe being left free of contact in the portion thereof exiting from said mist until the coating thereon is substantially thermoset to an infusible state, the pre-heat temperature of said pipe being above the lowest temperature at which said pulverulent material becomes infusible and up to the temperature at which decomposition of said pulverulent material occurs on contact with said heated pipe, said pulverulent material comprising a room-temperature-solid epoxy resin having oxirane oxygen groups, a latent heat-activatable epoxy-reactive hardener for said epoxy resin, and a curing accelerator for the reaction between said epoxy resin and hardener.

2. A continuous process of coating pipe with an infusible resin coating to protect the pipe against corrosion comprising continuously passing a pre-cleaned and pre-heated pipe horizontally through a mist of pulverulent temporarily-thermosoftenable rapidly-thermosetting organic resin material, out of which mist the particles of pulverulent material contacting said heated pipe adhere to its surface and coalesce to form an essentially uniformly thick coating which autogenously thermosets in situ to an infusible state using residual heat in said underlying pipe, said pipe being left free of contact in the portion thereof exiting from said mist until the coating thereon is substantially thermoset to an infusible state, said pipe being pre-heated to a temperature above the lowest temperature at which said pulverulent material becomes infusible and up to the temperature at which said pulverulent material decomposes on contact with said heated pipe, said pulverulent material comprising a room-temperature-solid epoxy resin having oxirane oxygen groups, a latent heat-activatable epoxy-reactive hardener for said epoxy resin, and a curing accelerator for the reaction between said epoxy resin and hardener.

3. A continuous process for providing metal pipe with a fused, uniformly-thick, pinhole-free, protective coating, said coating being formed from a pulverulent heat-fusible material comprising a room-temperature-solid epoxy resin having oxirane oxygen groups, a latent heat-activatable epoxy-reactive hardener for said epoxy resin, and a curing accelerator for the reaction between said epoxy resin and hardener, said process comprising (1) heating said pipe to a temperature sufficient to effect heat-fusion adherence and thermosetting of said pulverulent material to pre-cleaned surfaces of the pipe, (2) conveying said pipe continuously at a controlled uniform rate in an essentially horizontal path through an entry port into a turbulent zone of said pulverulent material, said pulverulent material being maintained in turbulence in said turbulent zone by a continuous forced circulatory system of gas with the pulverulent material entrained therewith, (3) maintaining said heated pipe in said zone under continuous movement for a time sufficient to allow said pulverulent material to deposit and adhere to the cleaned heated surfaces thereof, and (4) continuously removing said pipe from said zone at a rate equal to the rate of introduction of the same into said zone while maintaining said coating free of contact at the port of removal, said pipe being left free of supporting contact in the portion thereof removed from said zone until the coating on said portion is substantially thermoset to an infusible state using residual heat from the heated pipe itself.

4. The process of claim 3 wherein the pipe as it is removed from the turbulent zone contains non-fused particles of said pulverulent material adhering to the external portion of the resin coating thereupon, the heat of said pipe being sufficient to effect subsequent fusion and thermosetting of said non-fused particles.

5. A continuous process for coating articles with a fused essentially-uniformly-thick pinhole-free in-situ-cured protective resin layer, said layer being formed from a pulverulent mass of heat-fusible rapidly-thermosetting solid epoxy resin, the process comprising heating said articles to a temperature sufficient to effect heat fusion adherence and thermosetting of said pulverulent epoxy resin upon the surfaces thereof, conveying said heated articles continuously at a controlled uniform rate in an essentially horizontal path through an entry port into a turbulent zone of said pulverulent epoxy resin, said pulverulent resin being maintained in turbulence in said turbulent zone by a continuous forced circulatory system of gas with the pulverulent resin entrained therewith, maintaining said articles in said zone of turbulence under continuous movement for a time sufficient to allow said pulverulent resin to deposit and adhere upon the heated surfaces thereof, said adhered pulverulent resin being fused and cured autogenously upon the heated surfaces of said articles, and continuously removing said articles from said zone at a rate equal to the rate of introduction of the same therein.

6. A continuous process for coating metal pipe with a fused essentially-uniformly-thick pinhole-free in-situ-cured protective resin layer, said layer being formed from a pulverulent mass of heat fusible thermosettable resinous material, said process comprising heating said metal pipe to a temperature sufficient to effect heat fusion adherence and thermosetting of said pulverulent resinous material upon the surfaces thereof, conveying said heated metal pipe continuously at a controlled uniform rate in an essentially horizontal path through an enveloping mist of said pulverulent resinous material maintained in motion by a continuous forced circulatory system of gas entraining said pulverulent resinous material therewith, maintaining said metal pipe under continuous movement through said enveloping mist of pulverulent resinous material for a time sufficient to allow particles of said pulverulent resinous material to deposit and adhere upon the heated surfaces of said metal pipe, and passing said metal pipe continuously out of said mass of pulverulent resinous material at a rate equal to the rate of introduction of the same therein while maintaining the coated surfaces thereof free of contact until the coating thereon coalesces into a smooth film and thermosets, the heat of said metal pipe being sufficient to effect said coalescence and thermosetting of said coating.

References Cited in the file of this patent

UNITED STATES PATENTS

| 832,288 | Benny | Oct. 2, 1906 |
| 1,068,732 | Bradley | July 29, 1913 |
| 1,263,858 | Cole | Apr. 23, 1918 |
| 2,287,825 | Postlewaite | June 30, 1942 |
| 2,719,093 | Voris | Sept. 27, 1955 |
| 2,737,461 | Heisler et al. | Mar. 6, 1956 |
| 2,794,448 | Marantz | June 4, 1957 |
| 2,798,509 | Bergquist | July 9, 1957 |
| 2,844,489 | Gemmer | July 22, 1958 |
| 2,969,038 | Neuman | Jan. 24, 1961 |
| 2,997,776 | Matter et. al. | Aug. 29, 1961 |
| 3,004,861 | Davis | Oct. 17, 1961 |
| 3,028,251 | Nagel | Apr. 3, 1962 |
| 3,032,816 | Zimmerli | May 8, 1962 |
| 3,039,987 | Elbling | June 19, 1962 |

FOREIGN PATENTS

| 700,177 | Great Britain | Nov. 25, 1953 |

OTHER REFERENCES

Gemmer article published in Plastverarbeiter, September 1956, pages 342–348.

Molten Salt Finishing, vol. 23, No. 1, page 64.

Irving Skeist et al.: "Epoxy Resins," 1958, Reinhold Publishing Corporation, New York, pp. 23, 24 and 199.